United States Patent [19]
Tsuzuki et al.

[11] Patent Number: 5,538,927
[45] Date of Patent: Jul. 23, 1996

[54] SILICON NITRIDE POWDER AND ITS MANUFACTURING

[75] Inventors: Yasushi Tsuzuki; Tomoyuki Awazu; Akira Yamakawa, all of Itami, Japan

[73] Assignee: Sumitomo Electric Industries, Ltd., Osaka, Japan

[21] Appl. No.: 403,122

[22] Filed: Mar. 13, 1995

Related U.S. Application Data

[63] Continuation of Ser. No. 7,722, Jan. 22, 1993, abandoned.

[30] Foreign Application Priority Data

Jan. 24, 1992 [JP] Japan ..................... 4-034186
Feb. 26, 1992 [JP] Japan ..................... 4-076302

[51] Int. Cl.⁶ ................................. C04B 35/584
[52] U.S. Cl. ................................. 501/97; 423/344
[58] Field of Search .................... 423/344; 501/97

[56] References Cited

U.S. PATENT DOCUMENTS

| | | | |
|---|---|---|---|
| 4,983,371 | 1/1991 | Pitzer et al. | 501/97 X |
| 5,030,434 | 7/1991 | Pitzer et al. | 423/344 |
| 5,066,473 | 11/1991 | Pitzer et al. | 501/97 X |
| 5,081,079 | 1/1992 | Ukyo et al. | 501/97 |
| 5,258,169 | 11/1993 | Wannagat et al. | 501/97 X |

FOREIGN PATENT DOCUMENTS 1313308  12/1989  Japan ..................... 423/344

*Primary Examiner*—Karl Group
*Attorney, Agent, or Firm*—Wenderoth, Lind & Ponack

[57] ABSTRACT

A silicon nitride powder with which a highly reliable silicon nitride with high strength and small strength and dimensional variances is obtainable is disclosed. By setting the amount of their surface acidic groups per B.E.T. surface area to not less than 0.2 $\mu eq/m^2$, their dispersibility in a mixing solvent is drastically improved. By using them, moldings with high density and homogeneity can be obtained, thereby enabling in turn a highly reliable sintered product of silicon nitride with high strength and small strength and dimensional variances to be easily manufactured. Besides, in the silicon nitride powder, the proportion of the silicon [Si*] belonging to $SiO_2$, of the surface silicon [Si], which is determined by the X-ray photoelectron spectroscopy (XPS), should be not less than 0.07 in its atomic ratio [Si*/Si] and that to silicon of the surface carbon [C] which is determined by XPS in the same way should be not more than 0.20 in its atomic ratio [C/Si].

5 Claims, 1 Drawing Sheet

● Mark: Measuring spot (n=21)

Dimensional unit: mm

SILICON NITRIDE POWDER AND ITS MANUFACTURING

BACKGROUND OF THE INVENTION

This application is a continuation of now abandoned application, Ser. No. 08/007,722, filed Jan. 22, 1993 now abandoned.

FIELD OF THE INVENTION

The present invention relates to silicon nitride powders and, more particularly, pertains to a silicon nitride powder, with which it is possible to produce a molding which is homogeneously packed with the powder at a high density, which characteristic is required for obtaining a highly reliable sintered product of silicon nitride with high strength and small variance of strength and dimension.

DESCRIPTION OF RELATED ART

In the usual method of manufacturing a sintered product of silicon nitride, silicon nitride powders and sintering aid powders, mainly $Y_2O_3$, $Al_2O_3$, etc., are mixed in a solvent such as trichloroethane using a ball mill or the like, thereby turning the mixture into a slurry. Then after adding and mixing a molding binder to the slurry, it is molded by direct slip casting or pressure slip casting or the slurry is dried and then subjected to dry powder press molding or injection molding, thereby producing a molding. This molding is thermal debinded, as required, followed by sintering. In this way, a sintered product is manufactured.

In these methods, if the type of the sintering aids, their amounts added and the sintering conditions are identical, the physical properties of each sintered product, for example, its strength, dimensional accuracy and variances in its physical properties are influenced mainly by density and the packing structure of the molding. Heretofore, in order to have increased density of the molding, the particle size and particle size distribution of the silicon powders to be used as the raw material have been controlled, as disclosed in Japanese Patent Laid-Open Publication Hei 3-159907, for example. On the other hand, from the standpoint of making improvement in the physical properties of the sintered product, silicon nitride powders to be used as the material tend to be finely granulated (e.g, Tsuneo Shimamura, Funmatsu To Kogyo (Powders and Industry), p.36, Vol. 21, No. 8 (1989)).

When manufacturing a sintered product of silicon nitride, the sinterability differs depending on the physical properties of the silicon nitride powders as the raw material and on the characteristics of material powders of silicon nitride. Mainly their oxygen content has been examined in regard to its effects on the sinterability and the physical properties of the sintered product obtained therewith.

However, when fine grain silicon nitride powders are used as the raw material, the molding obtained therewith has low density, giving rise to problems of developing density irregularity (which refers to a phenomenon of wide variances in the density as measured by microfocus γ-ray diffraction), and pores or holes in the interior of such a molding.

Another problem has been that even if the oxygen content of the silicon nitride powders, being the raw material, is controlled, their sinterability differs from lot to lot or even within a same lot, resulting in large variances in the characteristics of the sintered product obtained. Thus its reproducibility is poor, detracting from obtaining a sintered product with stable quality.

SUMMARY OF THE INVENTION

The present inventors, as a result of their assiduous studies of the problems above-mentioned, have found that the dispersibility of a silicon nitride powder in the solvent during the mixing process greatly changes depending on the surface characteristics of the silicon nitride powder, that the dispersed state of the silicon nitride powder in the mixing solvent in turn affects the packing structure of the powder molding produced therewith and further that the improvement in their dispersed state by adjustment of their surface characteristics and the control of the amount of the surface carbon have the effect of improving the molding's sinterability. These findings have led to this invention.

Accordingly, it is an object of this invention to provide a silicon nitride powder which can produce a homogeneously packed, and high density molding, from which a highly reliable sintered product of silicon nitride with high strength and small variance of strength and dimension may be formed.

Another object of this invention is to provide a readily sinterable silicon nitride powder which permits stable production of sintered products with high strength.

Further object of this invention is to provide a method of manufacturing a silicon nitride powder, which ensures production of a readily sinterable silicon nitride powder with which high strength sintered products may be steadily obtained.

The above-mentioned objects and characteristic features of this invention will be more fully understood from the following description taken in conjunction with the accompanying drawing.

The average primary particle size according to this invention is determined by direct observation of primary particles under a scanning electron microscope and the mean particle size is measured by a laser diffraction particle size distribution analyzer.

The silicon nitride powders of this invention have the belowmentioned characteristic features:

First of all, the silicon nitride powder of this invention shall have not less than 0.07 atomic ratio (or not less than 7 atomic %) but not more than 0.5 atomic ratio (or not more than 50 atomic %) of Si atoms belonging to $SiO_2$ to total Si atoms on the same powder surfaces, which are determined for certain by the X-ray photoelectron spectroscopy (XPS).

Such powders bring about improved affinity with the liquid phase consisting of sintering aids, thus facilitating the sintering,-and assure its uniform proceeding, thereby enabling a high strength sintered product to be produced with small variances in its physical properties and with high density.

Secondly, the silicon nitride powders of this invention shall have not more than 0.20 atomic ratio of C atoms to Si atoms on the same powder surfaces, as verified by XPS. By adding this aspect to the aforementioned first one, the reduction by C of the aforementioned $SiO_2$ layer formed on the silicon nitride powder surface at the sintering time is suppressed, ensuring achievement of the aforementioned effect.

Thirdly, they shall have not less than 0.2 μeq/m² of surface acidic groups per B.E.T. surface area in addition to the aforementioned characteristic features. In this way, the dispersibility of the powder in the solvent is further improved, thereby further promoting the aforementioned effects in the molding and the sintered product.

Further, in order to more facilitate the sintering, thereby to control the micro-structure of the sintered product, the average primary particle size of the powder shall be set to not more than 0.5 μm. In this case, the powder's cohesive power is large and therefore for easy dispersion of the powder in the solvent, the amount of the surface acidic groups per B.E.T. surface area of the powder shall be not less than 1.0 μeq/m$^2$.

Besides, if the atomic ratio of Si atoms belonging to SiO$_2$ to Si atoms on the same powder surfaces is not less than 0.07, as hereabove-described, in addition to the abovementioned effects, decomposition of the powder by water is prevented, thereby enabling more stable mixing in water.

Fourthly, as a powder manufacturing method that makes distinctive the effects of this invention hereabove-mentioned, the silicon diimide decomposition process which makes it possible to have spherical particles with a not more than 1 μm mean particle size should be used. Sometimes the direct nitriding method is also used.

By heating such a powder at 500°–850° C. in the atmosphere, the powder which characterizes this invention can be obtained.

Further, according to this invention, in addition to the above-described characteristic features, the silicon nitride powders should be prepared with the amount of the surface acidic groups per B.E.T. surface area set not less than 0.2 μeq/m$^2$, whereby still desirable result is achieved.

By using a silicon nitride powder with not less than 0.2, preferably not less than 0.5 μeq/m$^2$ of surface acidic groups per B.E.T. surface area, their dispersibility in the solvent is still greatly enhanced, yielding a homogeneous molding with higher density to boot. Whereas, if the silicon nitride powder has smaller than 0.2 μeq/m$^2$ of surface acidic groups per B.E.T. surface area, their dispersed state in the solvent is notably worse with marked cohesion.

Furthermore, in order to control the microstructure of the sintered product, it is desirable to use a fine silicon nitride powder having not more than 0.5 μm primary particle sizes. Such a fine powder has large cohesive forces exerted therebetween. Therefore, it should desirably have a not less than 1.0 μeq/m$^2$ of surface acidic groups per B.E.T. surface area.

No particular limitation is placed on the mixing solvent, but as the dispersibility of a silicon nitride powder in such a polar solvent as alcohol, water or the like is remarkably improved by controlling the amount of its surface acidic groups per B.E.T. surface area in the range hereabovementioned, this tendency being more pronounced with larger dielectric constants of the solvents.

As a solvent, water has a large dielectric constant, is low-priced and does not require safety countermeasures such as explosion-proofing, as is the case with combustible organic solvents. It is therefore very excellent in industrial applications, but it has a problem that generally a silicon nitride powder is not stable in water. In this connection, in addition to controlling the amount of their surface acidic groups, by setting the proportion of the silicon [Si*] belonging to SiO$_2$, of the surface silicon [Si] of the silicon nitride, not less than 0.07 in its atomic ratio [Si*/Si], as determined by XPS, as hereabove described, enables that they are stabilized at mixing in water and further, controlling in the aforementioned range the amount of their surface acidic groups per B.E.T. surface area enables enhancement of their dispersibility. If use were made of a silicon nitride powder with a less than 0.07 [Si*/Si] ratio, the silicon nitride powder could undesirably be decomposed by water.

The silicon nitride powders having not less than 0.2 μeq/m$^2$ surface acidic groups per B.E.T. surface area according to this invention may be obtained by heating a silicon nitride powder synthesized by the silicon diimide decomposition process, direct nitriding process or the other method in an atmosphere containing not less than 1% by volume of oxygen or in a not less than 0.5% by volume steam atmosphere. The treating temperature should preferably be 500°–850° C. in the case of the oxygen atmosphere and 200°–800° C. in the case of the steam atmosphere.

Since by the aforementioned heat treatment, SiO$_2$ coatings are formed on the silicon nitride powder surfaces, it is possible to have not less than 0.07 [Si*/Si] ratios on the silicon nitride powder surface.

When mixing the silicon nitride powder with the sintering aid powder, wet mixing making use of any of various solvents is generally practiced. At this time, for improvement in the dispersibility mainly of the sintering aid powders, a surface active agent or deflocculant is added. However improved is the dispersibility of the sintering aid powder in the solvent, if the dispersibility in the solvent of the silicon nitride powder, being the main component, is insufficient, cohesion of the silicon nitride powder will take place. This causes density irregularity, pores or holes of the molding in wet molding, particularly in molding by slip casting or by pressure slip casting.

Moreover, when drying-granulation is performed by use of a spray drier or the like device, pores or other uneven structures of the powder will develop during the granulation. Further, in the aforementioned process of wet molding or drying, the larger cohesive forces of the powder tend to produce the sparser packing structure with the contact between the powder particles becoming uneven, as the solvent is removed, yielding a heterogeneous molding with low density.

As a shearing force is given to the silicon nitride powder in the solvent by stirring or by other means, weak flocculates are temporarily deflocculated, but are immediately reflocculated. Thus their dispersibility will be determined by the state of equilibrium between flocculation and deflocculation.

In a polar solvent, the electrostatic repulsion attributable to the powder surfaces' electric charge inhibits this reflocculation, thereby contributing to the dispersibility. Therefore, in order to effectively manifest this electrostatic repulsion, first, coating the surfaces of the silicon nitride powder particles with the solvent is mandatory. Thus it may be inferred that low wettability between the silicon nitride powder and such a solvent results in low dispersibility of silicon nitride powder, that if the powder is flocculated, before immersed into the solvent, the solvent will not permeate between powder particles forming the flocculates and that deflocculation of them is difficult to effect even by applying any shearing force.

In contrast, the silicon nitride powders according to this invention have the surface acidic groups having strong affinity with the polar solvent existing in an amount necessary for the overall powder surface to be wetted by the solvent. On this account, their wettability to the solvent is drastically improved, thereby enabling notable upgrading in their dispersibility in the solvent.

Besides, when water is used as the polar solvent, decomposition of silicon nitride by water takes place, but as use is made of a silicon nitride powder of this invention having a not less than 0.07 [Si*/Si] ratio abovementioned, its decomposition by water is preventable due to the $SiO_2$ coating existing on the surfaces of the silicon nitride powder.

It should be noted that the amount of the surface acidic groups per B.E.T. surface area and the [Si*/Si] ratio have been determined by the undermentioned methods: <Amount of surface acidic groups per B.E.T. surface area>

After vacuum drying a silicon nitride powder at 110° C. for 12 hr, 10 g of them were weighed. They were then transferred to a flask made of polypropylene. Its contents were shaken at 25° C. for 4 hr, with 100 ml of a 1/100 N aqueous solution of NaOH added. The powder was settled by centrifugal separation, and the resulting supernatant liquid was weighed at 25 ml and titrated with a 1/100 N aqueous solution of HCl, with phenolphthalein as the indicator. Similarly, a blank test was performed, without adding silicon nitride powder and with the titre of the blank test as the reference, the amount of acidic groups per B.E.T. surface area is determined by the undermentioned formula. The measurement was taken five times with each sample and the average of the results was regarded as the measured value.

Amount of surface acidic groups per B.E.T. surface area ($\mu eq/m^2$)=

$$\frac{100/25(B-X) \cdot K}{W \cdot S} \times 1000$$

X: Titre of aqueous solution of HCl (ml)
B: Titre of blank test (ml)
K: Normality of aqueous solution of HCl (N)
W: Weight of silicon nitride powder (g)
S: B.E.T. Surface area of silicon nitride powder ($m^2/g$)
<[Si*/Si] Ratio>

After vacuum drying at 110° C. for 12 hr, a silicon nitride powder was subjected to a degassing treatment for 1–8 hr in a preparatory chamber for XPS which is held at the room temperature and under a vacuum of $10^{-4}$–$10^{-5}$ torr, and then after the sample had been introduced into an analyzing chamber and the vacuum degree of the background become on the order of $10^{-10}$ torr, the measurement was taken. The total silicon [Si] on the surface was determined from the Si2p peaks, wave form separation of Si2p was made and the peak at 103.4 eV±0.5 eV was regarded as the silicon [Si*] belonging to $SiO_2$, whereby the [Si*/Si] ratio was determined as the atomic ratio. For the measurement, Perkin Elmer Company's ESCA5400MC was used, with a monochromatic AlKα employed as the X-ray source.

In the silicon nitride powders of this invention, the [Si*/Si] ratio signifies the amount of $SiO_2$ existing on the silicon nitride powder surfaces, which should be in the range not less than 0.07 but not more than 0.50, preferably 0.10–0.35. If this [Si*/Si] ratio is less than 0.07, their sinterability notably declines, resulting in difficulty densification of the sintered product, but if it exceeds 0.50, the $SiO_2$ coating on the surface will become too thick, conversely resulting in lowered sinterability.

The [C/Si] ratio in this invention should be not more than 0.20, preferably not more than 0.15. If this [C/Si] ratio exceeds 0.20, the reduction of $SiO_2$ on the silicon nitride powder surface at the sintering time will be notable ($SiO_2$+C→SiO↑+CO↑). Thus the amount of $SiO_2$ decreases, resulting in lowered sinterability.

There may be mentioned as methods for controlling the [Si*/Si] ratio to within 0.07–0.50, as illustrated previously, for example, a method of forming $SiO_2$ layer by treating the silicon nitride powder surface with an alkoxide or a silane coupling agent and then heating it, thereby removing organic contents, a method of subjecting the silicon nitride powder to a heat treatment in an atmosphere in which oxygen is existing or in an atmosphere containing steam, a method of treating a silicon nitride powder in oxygen plasma, a method of treating a silicon nitride powder in an aqueous solution of acid or alkali, a method of depositing $SiO_2$ on the silicon nitride powder surfaces from an aqueous solution of hexafluorosilicic acid saturated with $SiO_2$ by adding boric acid, etc., thereto. Among them, the method of subjecting them to a heat treatment in the atmosphere is favorable, because it is simple and conveniently enables reduction of the amount of surface carbon.

In this instance, appropriate heating temperature should be 500–850° C., preferably 600–800° C. Not more than 500° C. heating temperatures are uneconomical because of the long time required for forming the desired $SiO_2$ due to low rate of oxidation on the silicon nitride surface, while those exceeding 850° C. are undesirable, because the oxidized state of the silicon nitride surface is uneven at such high temperatures.

As for the amount of the surface carbon, it may be cut down by the aforementioned heating treatment, but the [C/Si] ratio determined by XPS should desirably be controlled to not more than 0.25 at the stage before such a surface treatment by removing the carbon which has been mixed into the raw materials or the product at the manufacturing time.

For the purpose of removing Si or metal impurities remaining in the silicon nitride powder manufactured by direct nitride method, they are sometimes cleaned with hydrofluoric acid. Then if the F originating from such hydrofluoric acid remains, it will decompose the surface $SiO_2$ similarly as carbon. Therefore, such F needs to be completely removed.

In order to make the effects of this invention further distinctive, use of silicon nitride powders with their mean particle size not more than 1 μm which are manufactured by the silicon diimide decomposition process is desirable. The silicon nitride powders manufactured by the silicon diimide decomposition process originally have homogeneous surface state and are spherical in shape, so that the $SiO_2$ formed on the surface by the aforementioned surface treatment tends to form a uniform layer and has small carbon content. Besides, by reducing the mean particle size not more than 1 μm, the sinterability may be further improved. In addition, the amount of the surface $SiO_2$ may be continuously controlled to industrial advantage by introducing an atmosphere containing oxygen at the cooling step after the heating treatment for crystallization in the silicon nitride powder manufacturing process.

In the sintering process of silicon nitride powders, at the first stage, a liquid phase consisting of sintering aids develops, into which the silicon nitride powders dissolve, thereafter to deposit as crystal, and proceeding with their sintering. Accordingly, at the interface between the silicon nitride powders and the liquid phase consisting of the sintering aids, the affinity of the silicon nitride powder surface to the liquid phase is important. In this circumstance, coating the silicon nitride surface with $SiO_2$ is thought to upgrade their wettability with the liquid phase consisting of the sintering aids, thereby promoting the dissolution of the silicon nitride powders into the liquid phase for the benefit of improved sinterability.

Silicon nitride powders normally contain about 1–2% by weight of oxygen, depending on the manufacturing method.

It mostly exists on the surface. However, the oxygen on the silicon nitride surface is not all existing as $SiO_2$, but it is existing in various bonded forms other than $SiO_2$ such as, for example, $Si_2N_2O$, SiO or such a functional group as —OH. Therefore, even if their oxygen contents or the amounts of surface oxygen are merely equal, unequal amounts of $SiO_2$ on the surfaces will lead to difference in their sinterability.

In contrast, the silicon nitride powders according to this invention permit their wettability with the liquid phase consisting of sintering aids to be enhanced by controlling the amount of their surface $SiO_2$, thereby attaining large improvements in sinterability for the benefit of stable manufacture of high strength sintered products.

DETAILED DESCRIPTION OF THE PREFERRED EMBODIMENTS (EXAMPLE 1)

Figure 1:
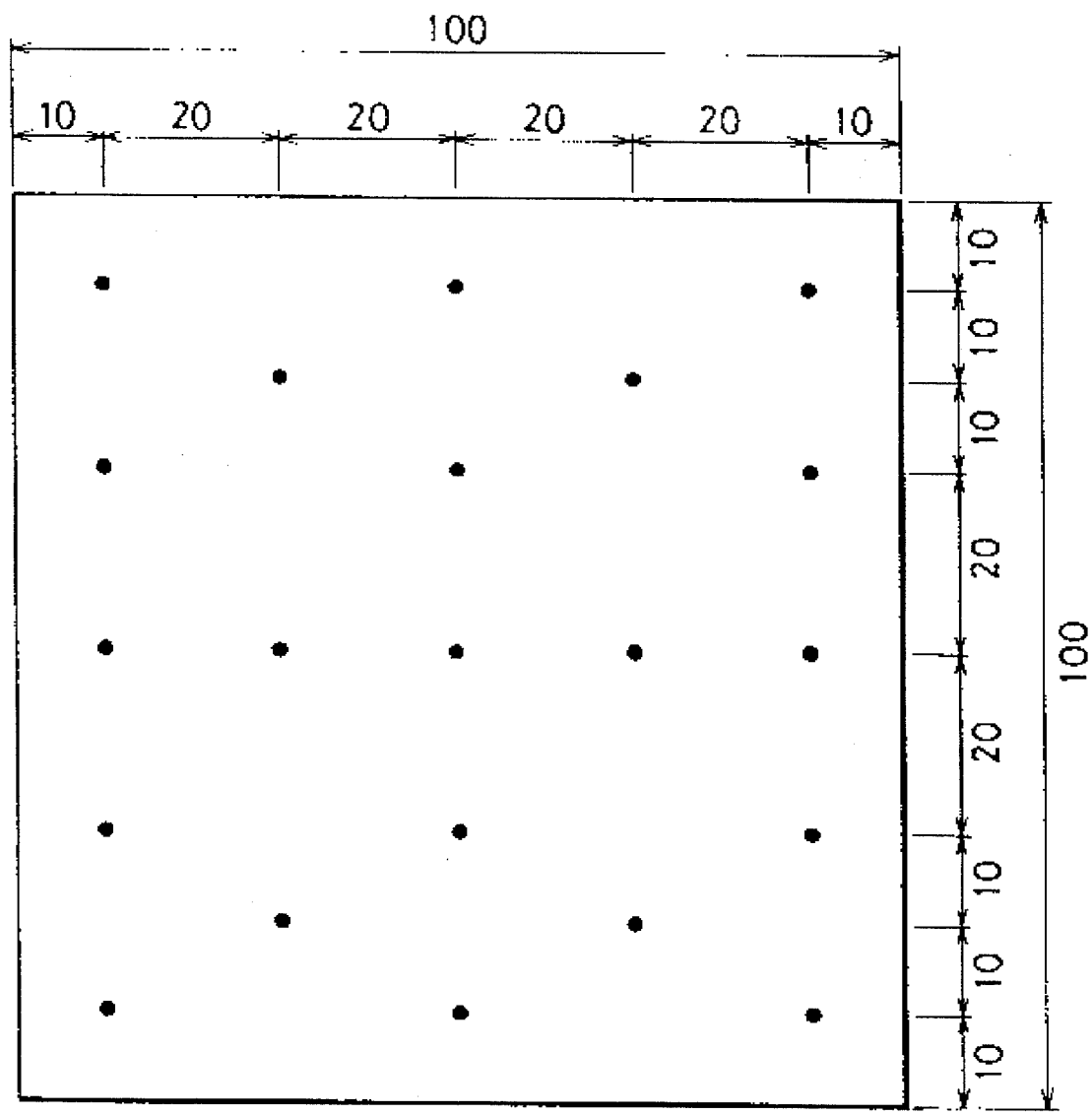
FIG. 1 is an explanatory digram of the density measuring spots in a molding.

Silicon nitride powders with 96.0% α-crystallinity and 0.2 μm average primary particle size were subjected to a heat treatment in an $N_2$ atmosphere or in the atmosphere containing 10% by volume of steam, yielding silicon nitride powders having the properties given in Table 1.

Then to 92 parts by weight of the silicon nitride powders, 5 parts by weight of $Y_2O_3$ with a 0.25 μm average primary particle size and 3 parts by weight of $Al_2O_3$ with a 0.15 μm average primary particle size were added as sintering aids and the mixture was mixed in a ball mill made of nylon at 100 rpm for 48 hr, with 70% by weight of ethanol in proportion to the total weight of the powders added. Thereafter, 0.5% by weight of a binder in proportion to the total weight of the powders was added thereto, followed by mixing for 1 hr. The slurry thus obtained was, after defoamed under vacuum, molded into a porous mold by pressure assisted slip casting under a pressure of 30 $kg/cm^2$, yielding a 10 cm×10 cm×5.5 mm$^t$ molding. This molding was dried at 100° C. for 12 hr and the densities at the spots indicated on FIG. 1 of its molding were measured by a microfocus γ- ray diffraction densimeter. The measurement results and the viscosity of each slurry, before molded, are put up on Table 2. Also the bulk density calculated from the weight and the dimensions of the molding are shown in this table.

The molding, after dried, was divided into 16 test pieces of 8 mm×48 mm×5.5 mm$^t$. These test pieces were debinded at 750° C. for 3 hr, then sintered at 1720° C. for 5 hr in an $N_2$ atmosphere and thereafter subjected to HIP treatment for 3 hr in $N_2$ at 1720° C. under 1000 atm.

The density of each sintered product thus obtained was determined by the Archimedes' method and its thickness measured. Thereafter, it was formed into a fracture strength test piece according to JIS R1601, which was then put to a 4 point bending test. The results are displayed in Table 2.

The results of Table 2 show that when the silicon nitride powders (C–I) of this invention were used, as against those (A and B) of Comparative Examples, the viscosity of the slurry declines with enhancement of dispersibility in ethanol and that the moldings obtained therewith have higher dense and smaller density variances. Large upgrading in the average strength, Weibull coefficient and dimensional accuracy of the sintered products are discernible.

(EXAMPLE 2)

With the silicon nitride powders A–I given in Table 1, moldings similar as in Example 1 were manufactured by the undermentioned procedure, using water as the solvent.

92 parts by weight of silicon nitride powders and 5 parts by weight of $Y_2O_3$ and 3 parts by weight of $Al_2O_3$, the latter two being the same as used in Example 1, were prepared. First, to the silicon nitride powders, deionized water adjusted to pH 9.5 with ammonia was added in 48% by weight in proportion to the total amount of the powders. This mixture was mixed in a ball mill made of nylon at 100 rpm for 12 hr. Subsequently, its mixing was continued for 12 hr with $Y_2O_3$ and $Al_2O_3$ added thereto. Then 0.5% by weight of a binder in proportion to the total amount of the powder was added and they were mixed further for 1 hr. pH Measurements of the slurries obtained from the silicon nitride powders A, B, E and G showed pH value increases respectively to 11.2, 10.7, 11.0 and 10.8, suggesting that decomposition of silicon nitride powders by water had occurred.

From these slurries, moldings and sintered products were manufactured after vacuum defoaming, similarly as in Example 1 and the characteristics of these molding and sintered products were measured. The results are put up in Table 3.

Table 3 indicates that similarly as in the results of Example 1 (Table 2), when the silicon nitride powders (C–I) of this invention were used, as against those (A and B) of Comparative Examples, moldings with higher dense and smaller density variances are obtained and the characteristics of sintered products are also upgraded.

Further, silicon nitride powders A, B, E and G with lower than 0.07 [Si*/Si] ratio underwent decomposition by water, giving degraded characteristics of their moldings and sintered products, as compared with the data obtained with ethanol as the solvent (Table 2), but the powders C, D, F, H an I with not less than 0.07 [Si*/Si] ratios underwent no decomposition and showed further improved characteristics of their moldings and sintered products, as compared with those obtained with ethanol solvent.

TABLE 1

| Silicon nitride powder sample No. | Comparative Example | | Example of this invention | | | | | | |
|---|---|---|---|---|---|---|---|---|---|
| | A | B | C | D | E | F | G | H | I |
| Amount of surface acidic groups per B.E.T. surface area (μeq/m$^2$) | 0.03 | 0.15 | 0.23 | 0.62 | 0.65 | 1.20 | 1.23 | 2.14 | 2.51 |
| [Si*/Si] Ratio (atomic ratio) | 0.04 | 0.05 | 0.07 | 0.11 | 0.04 | 0.20 | 0.05 | 0.18 | 0.17 |

TABLE 2

| Silicon nitride powder | Comparative Example | | Example of this invention | | | | | | |
|---|---|---|---|---|---|---|---|---|---|
| sample No. | A | B | C | D | E | F | G | H | I |
| Viscosity of slurry (CP) | 2650 | 2400 | 1330 | 1000 | 1030 | 620 | 618 | 585 | 540 |
| Density of molding (g/cm³) | | | | | | | | | |
| Microfocus γ-ray diffraction density | | | | | | | | | |
| Average density | 1.581 | 1.586 | 1.620 | 1.635 | 1.633 | 1.668 | 1.670 | 1.675 | 1.679 |
| Variance | 0.035 | 0.033 | 0.017 | 0.015 | 0.017 | 0.010 | 0.009 | 0.007 | 0.007 |
| Bulk | | | | | | | | | |
| Density | 1.582 | 1.585 | 1.620 | 1.634 | 1.634 | 1.668 | 1.669 | 1.675 | 1.678 |
| Characteristics of sintered product | | | | | | | | | |
| Thickness (mm) | | | | | | | | | |
| Average thickness | 4.320 | 4.323 | 4.359 | 4.368 | 4.367 | 4.401 | 4.400 | 4.406 | 4.410 |
| Variance | 0.125 | 0.118 | 0.059 | 0.053 | 0.054 | 0.028 | 0.030 | 0.025 | 0.024 |
| Strength | | | | | | | | | |
| Fracture strength (kg/mm²) | 105 | 107 | 115 | 117 | 116 | 122 | 122 | 124 | 123 |
| Weibull coefficient | 13 | 14 | 18 | 19 | 18 | 21 | 21 | 22 | 22 |

TABLE 3

| Silicon nitride powder | Comparative Example | | Example of this invention | | | | | | |
|---|---|---|---|---|---|---|---|---|---|
| sample No. | A | B | C | D | E | F | G | H | I |
| Slurry | | | | | | | | | |
| Viscosity (CP) | 5500 | 4950 | 2850 | 2300 | 2890 | 1050 | 2030 | 250 | 230 |
| pH | 11.2 | 10.7 | 9.7 | 9.6 | 11.0 | 9.5 | 10.8 | 9.5 | 9.5 |
| Density of molding (g/cm³) | | | | | | | | | |
| Microfocus γ-ray diffraction density | | | | | | | | | |
| Average density | 1.583 | 1.585 | 1.698 | 1.720 | 1.705 | 1.807 | 1.769 | 1.842 | 1.850 |
| Variance | 0.042 | 0.035 | 0.014 | 0.012 | 0.020 | 0.009 | 0.022 | 0.006 | 0.007 |
| Bulk | | | | | | | | | |
| Density | 1.584 | 1.592 | 1.696 | 1.721 | 1.705 | 1.808 | 1.769 | 1.853 | 1.856 |
| Characteristics of sintered product | | | | | | | | | |
| Thickness (mm) | | | | | | | | | |
| Average thickness | 4.322 | 4.322 | 4.428 | 4.462 | 4.430 | 4.521 | 4.490 | 4.554 | 4.554 |
| Variance | 0.134 | 0.124 | 0.033 | 0.031 | 0.062 | 0.015 | 0.058 | 0.012 | 0.012 |
| Strength | | | | | | | | | |
| Fracture strength (kg/mm²) | 98 | 100 | 120 | 123 | 112 | 126 | 115 | 129 | 128 |
| Weibull coefficient | 12 | 12 | 20 | 20 | 17 | 24 | 18 | 25 | 26 |

(EXAMPLE 3)

Silicon nitride powders with 96.0% α-crystallinity and 0.5 μm mean particle size shown in Table 4 which were manufactured by the silicon diimide decomposition process were treated in the atmosphere at temperatures of 700°–950° C. for 10 min–5 hr, yielding silicon nitride powders having the belowmentioned characteristics.

The surface oxygen (atomic %) in Tables 4 and 5 was measured by XPS.

TABLE 4

| $Si_3N_4$ Powders | [Si*/Si] | [C/Si] | Oxygen content (% by weight) | Surface oxygen (atomic %) |
|---|---|---|---|---|
| A | 0.04 | 0.20 | 1.2 | 22.0 |
| B | 0.08 | 0.25 | 1.4 | 25.0 |

TABLE 5

| Example category | Si₃N₄ powder | Treating conditions | | [Si*/Si] | [C/Si] | Oxygen content (% by weight) | Surface oxygen (atomic %) |
| --- | --- | --- | --- | --- | --- | --- | --- |
| | | Temperature | Time | | | | |
| Example of this invention | | | | | | | |
| 1 | A | 750° C. | 30 min | 0.08 | 0.15 | 1.3 | 23.5 |
| 2 | A | 800° C. | 30 min | 0.11 | 0.07 | 1.4 | 25.0 |
| 3 | B | 800° C. | 2 hr | 0.25 | 0.06 | 1.5 | 27.5 |
| 4 | B | 820° C. | 5 hr | 0.40 | 0.06 | 1.6 | 30.0 |
| Comparative Example | | | | | | | |
| 1 | A | Untreated | Untreated | 0.04 | 0.20 | 1.2 | 22.0 |
| 2 | B | Untreated | Untreated | 0.08 | 0.25 | 1.4 | 25.0 |
| 3 | A | 700° C. | 10 min | 0.06 | 0.19 | 1.2 | 23.0 |
| 4 | B | 950° C. | 1 hr | 0.65 | 0.05 | 1.8 | 29.0 |

Then to 92 parts by weight of these silicon nitride powders, 5 parts by weight of Y₂O₃ with a 0.7 μm average particle size and 3 parts by weight of Al₂O₃ with a 0.4 μm average particle size were added, then after mixing them by stirring for 5 hr, while irradiating them with an ultrasonic wave in ethanol, the mixture was dried and the mixed powders thus obtained were molded by dry press process into a configuration of 130×65×6 mm, followed by the CIP molding at 3000 kg/cm². This molding was sintered in N₂ gas at 1720° C. for 5 hr, yielding a primary sintered product. From this primary sintered product, 20 test pieces were cut out and the relative density of each test piece was determined by the Archimedes, method. Thereafter, it was subjected to a secondary sintering by the HIP treatment for 3 hr in N₂ at 1720° C. at 1000 atm. The product's relative density was then measured and it was put to 4 point bending test in accordance with JIS R1601. The measurement results are shown in Table 6.

bounds in their dispersibility in the mixing solvent, thereby to produce a molding with higher reliable silicon nitride sintered product with higher strength and smaller variances in its strength and dimensions.

Besides, by using silicon nitride powders in which in addition to increasing the amount of surface acidic groups per B.E.T. surface area, the [Si*/Si] ratio or the proportion of the silicon [Si*] belonging to SiO₂ of the surface silicon [Si], as determined by XPS, is increased, use of water as the solvent is made possible, so that a molding with higher density and homogeneity is manufacturable and so that in turn a silicon nitride sintered product excellent in its characteristics is obtainable at a low cost.

Furthermore, by making use of silicon nitride powders of this invention in which the amount of their surface SiO₂ and the amount of their surface carbon are controlled, their sinterability is upgraded and their sintering is made to homogeneously proceeded, thereby enabling stable produc-

TABLE 6

| Example category | Primary sintered product density | | Secondary sintered product density | | 4 Point bending strength | |
| --- | --- | --- | --- | --- | --- | --- |
| | Relative density (%) | Variance Rmax (%) | Relative density (%) | Variance Rmax (%) | Average Fracture strength (kgf/cm²) | Weibull coefficient (m) |
| Example of this invention | | | | | | |
| 1 | 96.2 | 0.12 | 99.2 | 0.03 | 118 | 20 |
| 2 | 97.1 | 0.10 | 99.3 | 0.02 | 120 | 21 |
| 3 | 98.0 | 0.10 | 99.4 | 0.02 | 125 | 22 |
| 4 | 98.0 | 0.20 | 99.1 | 0.03 | 115 | 19 |
| Comparative Example | | | | | | |
| 1 | 92.0 | 0.30 | 93.5 | 0.06 | 58 | 12 |
| 2 | 96.3 | 1.35 | 99.3 | 0.10 | 109 | 8 |
| 3 | 94.1 | 0.52 | 98.0 | 0.09 | 95 | 12 |
| 4 | 95.5 | 0.85 | 98.9 | 0.07 | 85 | 10 |

Table 6 indicates that silicon nitride sintered products obtained by using the silicon nitride powders embodying this invention have higher strength and small strength variances, as compared with those of Comparative Examples.

It should be noted that applications of this invention are not limited to the above-described embodiments, but it may be exercised with its conditions appropriately changed within the scope of this invention as set forth in the claims.

As described in the foregoing, by making use of the silicon nitride powders of this invention in which the amount of the surface acidic groups per B.E.T surface area is increased, it is possible to attain improvement by leaps and tion of high quality sintered product with higher strength and smaller strength variance.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A silicon nitride powder, characterized in having an atomic ratio (Si*/Si) of surface silicon (Si*) in the form of SiO₂ to total surface silicon (Si) of not less than 0.07 but not more than 0.50, and having an atomic ratio (C/Si) of surface carbon (C) to total surface silicon (Si) of not more than 0.20, as determined by X-ray photoelectron spectroscopy.

2. The silicon nitride powder as claimed in claim 1, wherein the amount of surface acidic groups per B.E.T. surface area of said powder is not less than 0.2 µeq/m$^2$.

3. The silicon nitride powder as claimed in claim 1, wherein the average primary particle size of said powder is not more than 0.5 µm and the amount of surface acidic groups per B.E.T. surface area of said powder is not less than 1.0 µeq/m$^2$.

4. The silicon nitride powder as claimed in claim 1, wherein the silicon nitride powder has a mean particle size of not more than 1 µm and is manufactured by a silicon diimide decomposition process.

5. A method of manufacturing a silicon nitride powder, which comprises heating silicon nitride power of about 1–2% by weight of oxygen in an oxygen-containing atmosphere at 500°–850° C., wherein the powder has an atomic ratio (C/Si) of surface carbon (C) to total surface silicon (Si) of not more than 0.25 as determined by X-ray photoelectron spectroscopy and a mean particle size which is not more than 1 µm, wherein said reaction is carried out for a time sufficient to obtain a silicon nitride powder characterized in having an atomic ratio (Si*/Si) of surface silicon (Si*) in the form of SiO$_2$ to total surface silicon (Si) of not less than 0.07 but not more than 0.50, and having an atomic ratio (C/Si) of surface carbon (C) to total surface silicon (Si) of not more than 0.20, as determined by X-ray photoelectron spectroscopy.

* * * * *